US012098009B2

(12) United States Patent
Bregeon

(10) Patent No.: US 12,098,009 B2
(45) Date of Patent: Sep. 24, 2024

(54) STAND ALONE DISPENSING POUCH

(71) Applicant: BOEHRINGER INGELHEIM ANIMAL HEALTH USA INC., Duluth, GA (US)

(72) Inventor: Veronique Bregeon, Lyons (FR)

(73) Assignee: BOEHRINGER INGELHEIM ANIMAL HEALTH USA INC., Duluth, GA (US)

( * ) Notice: Subject to any disclaimer, the term of this patent is extended or adjusted under 35 U.S.C. 154(b) by 786 days.

(21) Appl. No.: 17/120,963

(22) PCT Filed: Jul. 3, 2019

(86) PCT No.: PCT/US2019/040511

§ 371 (c)(1),
(2) Date: Dec. 14, 2020

(87) PCT Pub. No.: WO2020/014069

PCT Pub. Date: Jan. 16, 2020

(65) Prior Publication Data

US 2021/0315678 A1 Oct. 14, 2021

Related U.S. Application Data

(60) Provisional application No. 62/696,715, filed on Jul. 11, 2018.

(51) Int. Cl.

| | |
|---|---|
| ***B65D 75/58*** | (2006.01) |
| ***A61D 7/00*** | (2006.01) |
| ***B65D 65/40*** | (2006.01) |
| ***B65D 75/00*** | (2006.01) |
| ***B65D 75/56*** | (2006.01) |

(52) U.S. Cl.
CPC .......... *B65D 75/5877* (2013.01); *A61D 7/00* (2013.01); *B65D 65/40* (2013.01); *B65D 75/008* (2013.01); *B65D 75/566* (2013.01)

(58) Field of Classification Search
CPC . B65D 75/008; B65D 75/5877; B65D 75/566
See application file for complete search history.

(56) References Cited

U.S. PATENT DOCUMENTS

| | | | | |
|---|---|---|---|---|
| 5,125,919 | A | 6/1992 | Miller et al. | |
| 2002/0141664 | A1 | 10/2002 | Matsuda et al. | |
| 2004/0195382 | A1* | 10/2004 | Anderson | B05B 12/00 239/525 |
| 2009/0071978 | A1 | 3/2009 | Sharp et al. | |
| 2009/0234317 | A1 | 9/2009 | Navarro | |

(Continued)

FOREIGN PATENT DOCUMENTS

| | | | |
|---|---|---|---|
| CN | 1513732 | A | 7/2004 |
| EP | 3015372 | | 5/2016 |

(Continued)

OTHER PUBLICATIONS

English Abstract JP2007326603.
English Abstract JP10250747.
English Abstract CN1513732.

*Primary Examiner* — Derek J Battisti
(74) *Attorney, Agent, or Firm* — Steffan Finnegan

(57) ABSTRACT

The present invention relates to a stand-up pouch, for holding and dispensing fluid veterinary formulations, made of a flexible film material.

7 Claims, 10 Drawing Sheets

(56) References Cited

U.S. PATENT DOCUMENTS

| | | | | |
|---|---|---|---|---|
| 2017/0121082 | A1* | 5/2017 | Tiwari | B65D 31/10 |
| 2017/0197771 | A1* | 7/2017 | Smith | B65D 75/5883 |
| 2017/0290740 | A1* | 10/2017 | Subramanian | A61J 1/1475 |
| 2018/0086526 | A1* | 3/2018 | Schulz | B65D 31/10 |
| 2020/0017269 | A1* | 1/2020 | Duckwall, Jr. | B65D 83/0055 |

FOREIGN PATENT DOCUMENTS

| | | | | |
|---|---|---|---|---|
| JP | 10250747 | A | 9/1998 | |
| JP | 2006061058 | A | 3/2006 | |
| JP | 2007326603 | A | 12/2007 | |
| JP | 2016074463 | * | 5/2016 | B65D 33/08 |
| JP | 2016147708 | A | 8/2016 | |
| JP | 2018516066 | A | 5/2018 | |
| JP | 2018516812 | A | 6/2018 | |
| WO | 2016154467 | A1 | 9/2016 | |
| WO | 2016168278 | A1 | 10/2016 | |

* cited by examiner

STAND ALONE DISPENSING POUCH

CROSS-REFERENCE TO RELATED APPLICATIONS

This application claims the benefit of U.S. Provisional Patent Application No. 62/696,715, filed Jul. 11, 2019 which is incorporated by reference in its entirety herein and is relied upon for all purposes.

FIELD OF THE INVENTION

The present invention relates to a stand-up pouch for use in storing, transporting and dispensing fluid veterinary formulations to animals. A method for filling and using the pouch is also provided.

BACKGROUND OF THE INVENTION

A disadvantage of current stand-up pouches for storing, transporting and dispensing fluid veterinary formulations to animals is that they are not easy for the end user to use and difficult to store and transport.

SUMMARY OF THE INVENTION

Accordingly, it is an object of the invention to provide safe, easy and stable stand-up pouches for storing, transporting and dispensing fluid veterinary formulations to animals.

The invention in its particular features will become more apparent from the following detailed description considered with reference to the accompanying examples. The following description will continue to discuss the problems and solutions offered by the present invention as they pertain to veterinary applications.

It is noted that the invention does not intend to encompass within the scope of the invention any previously disclosed product, process of making the product or method of using the product, which meets the written description and enablement requirements of the USPTO (35 U.S.C. 112, first paragraph) or the EPO (Article 83 of the EPC), such that applicant(s) reserve the right and hereby disclose a disclaimer of any previously described product, method of making the product or process of using the product.

It is further noted that in this disclosure and particularly in the claims and/or paragraphs, terms such as “comprises”, “comprised”, “comprising” and the like can have the meaning attributed to it in U.S. patent law; e.g., they can mean “includes”, “included”, “including”, and the like; and that terms such as “consisting essentially of” and “consists essentially of” have the meaning ascribed to them in U.S. patent law, e.g., they allow for elements not explicitly recited, but exclude elements that are found in the prior art or that affect a basic or novel characteristic of the invention.

These and other embodiments are disclosed or are apparent from and encompassed by, the following Detailed Description.

BRIEF DESCRIPTION OF THE SEVERAL VIEWS OF THE DRAWINGS

Several features of the present invention are further described in connection with the accompanying drawings in which:

There is illustrated in FIG. 1 a perspective view of one embodiment of a stand-up pouch of the present invention in use.

Figure 1:
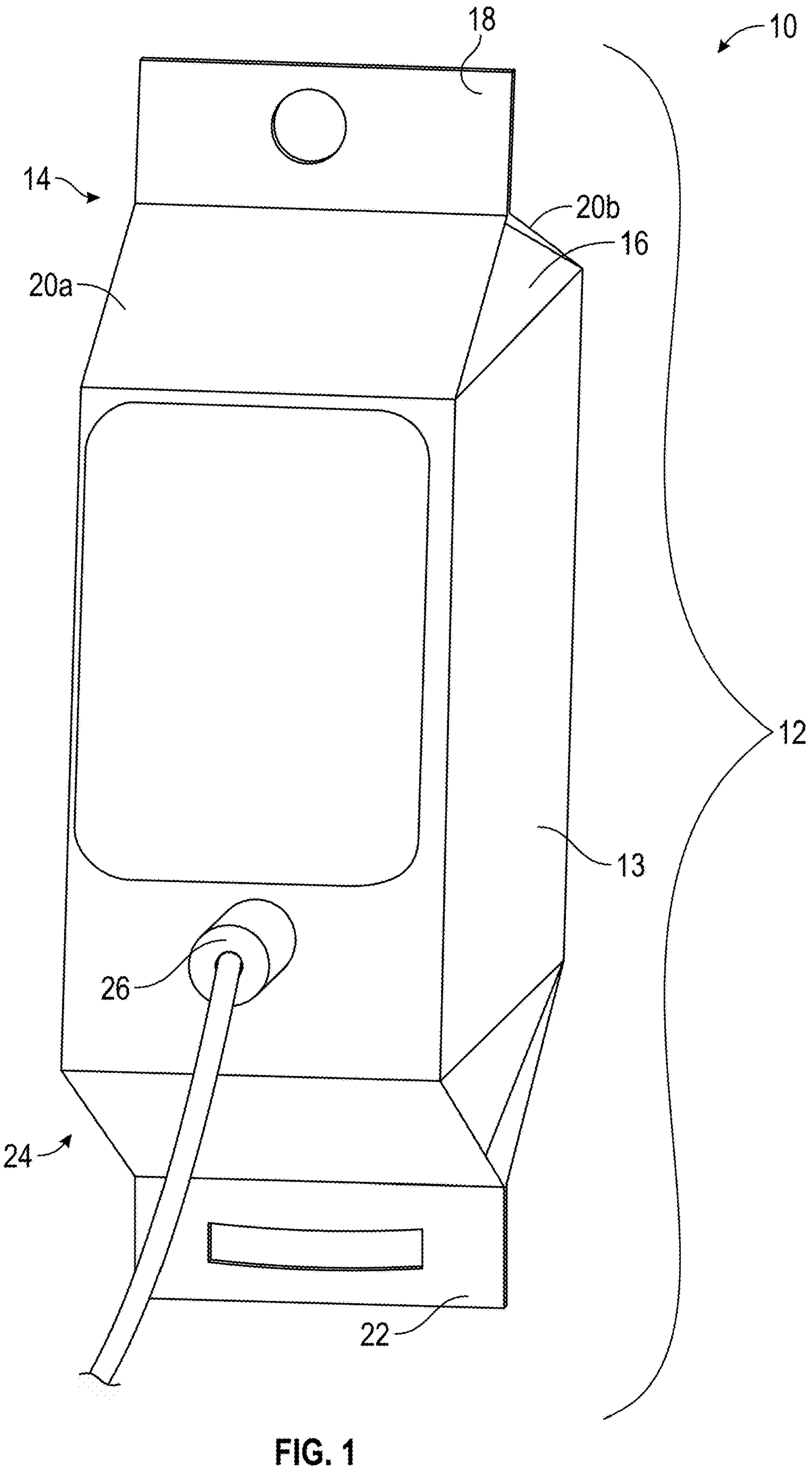
Figure 2:
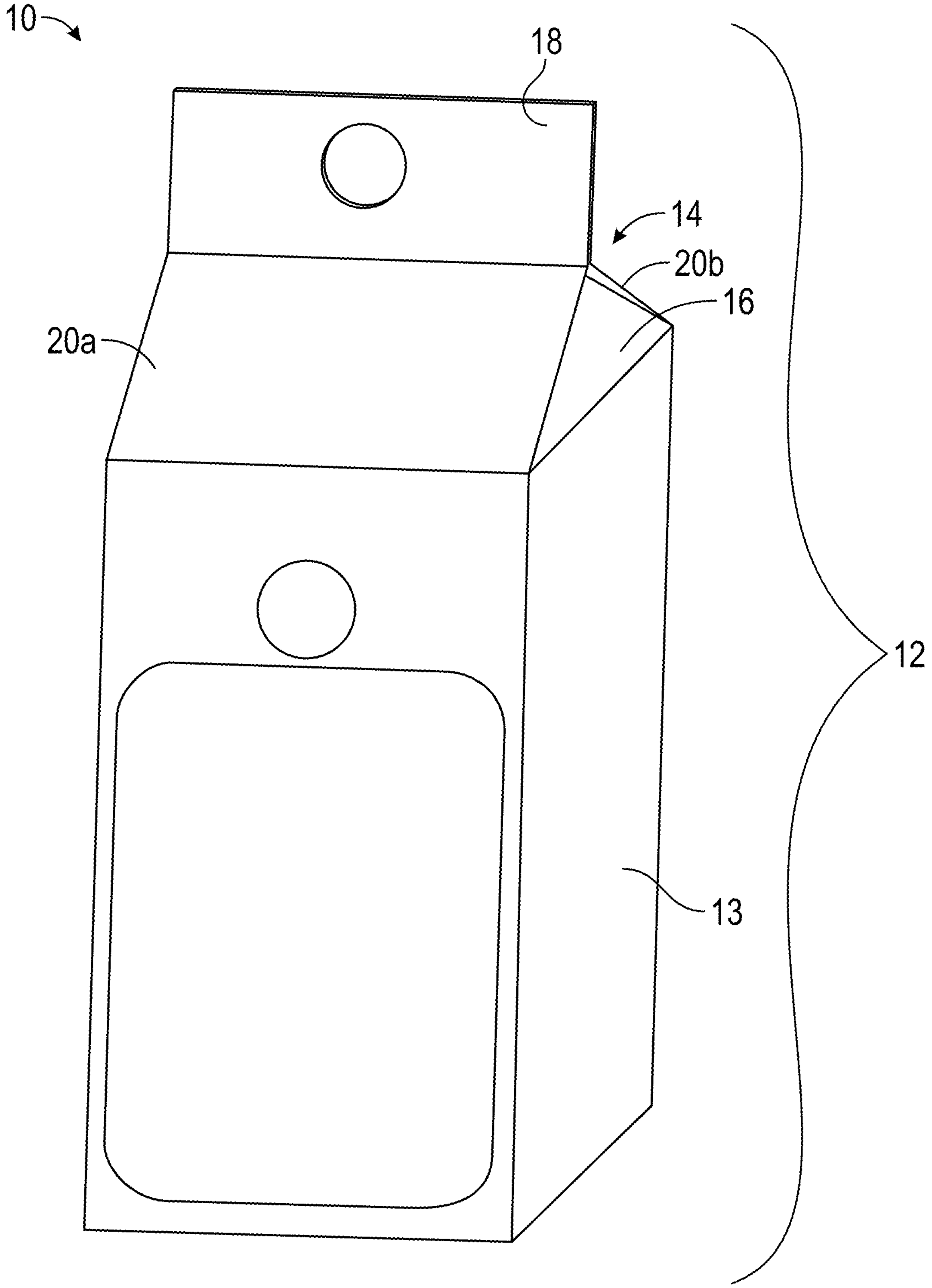

There is illustrated in FIG. 2 a perspective view of one embodiment of a stand-up pouch of the present invention in position for storage or transport.

Figure 3:
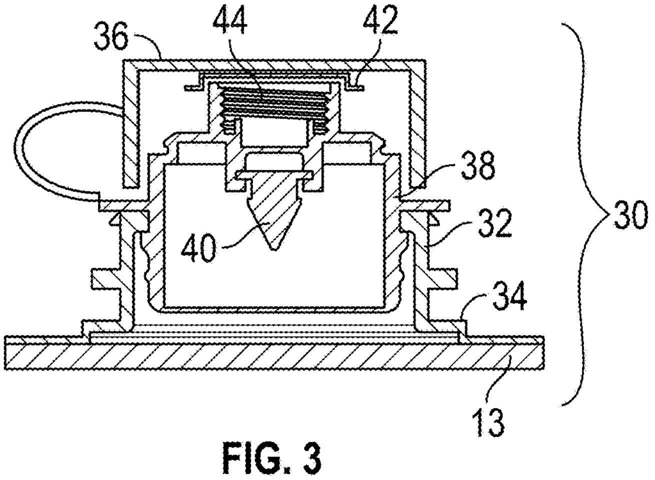

There is illustrated in FIG. 3 a cross sectional view of a portion of the pouch body.

Figure 4A:
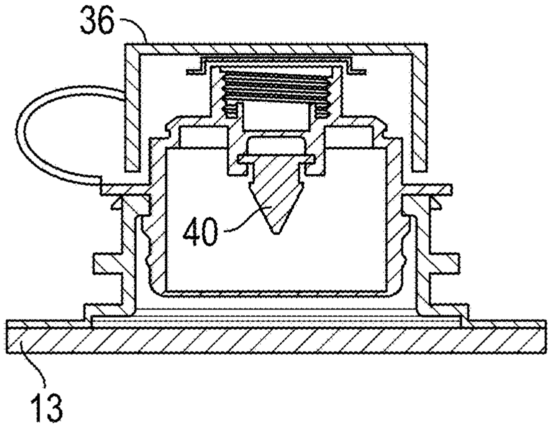

There is illustrated in FIG. 4A there is a cross sectional views of a portion of the pouch body with an embodiment of the female connector body.

Figure 4B:
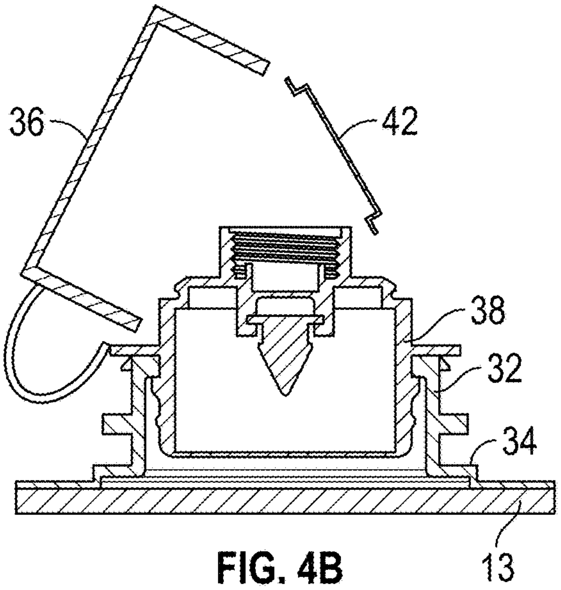

FIG. 4B is a cross-sectional view of the embodiments of FIG. 4A wherein a cap 36 and protective seal 42 have been removed.

Figure 4C:
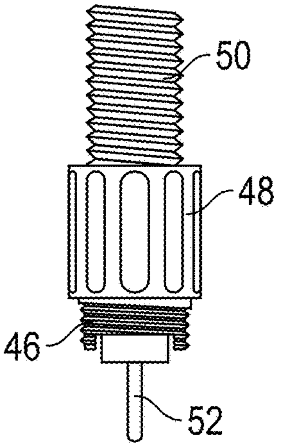

FIG. 4C is a perspective view of a male connector body which may engage the female connector body of FIG. 4A.

Figure 4D:
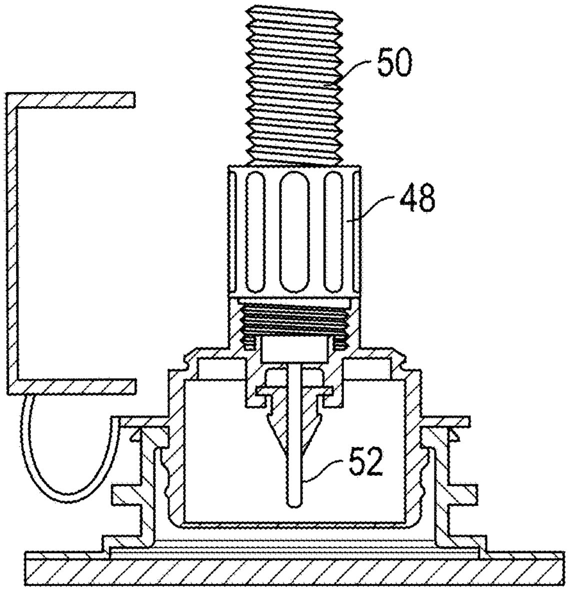

FIG. 4D is a cross-sectional view of the male and female connector bodies fully engaged.

Figure 5:
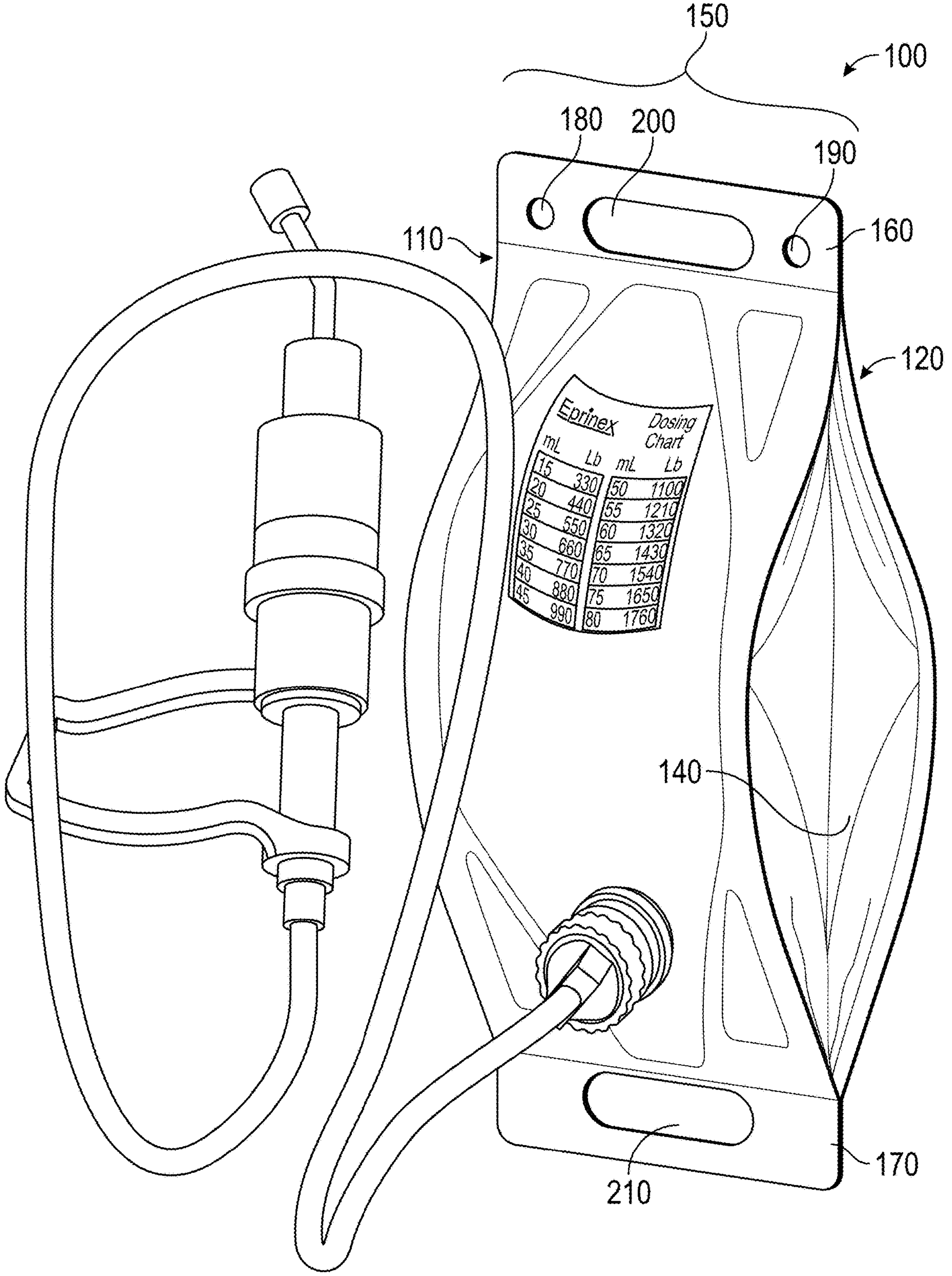

There is illustrated in FIG. 5 a perspective view of a second embodiment of the present invention in use, with a hose and applicator.

Figure 6:
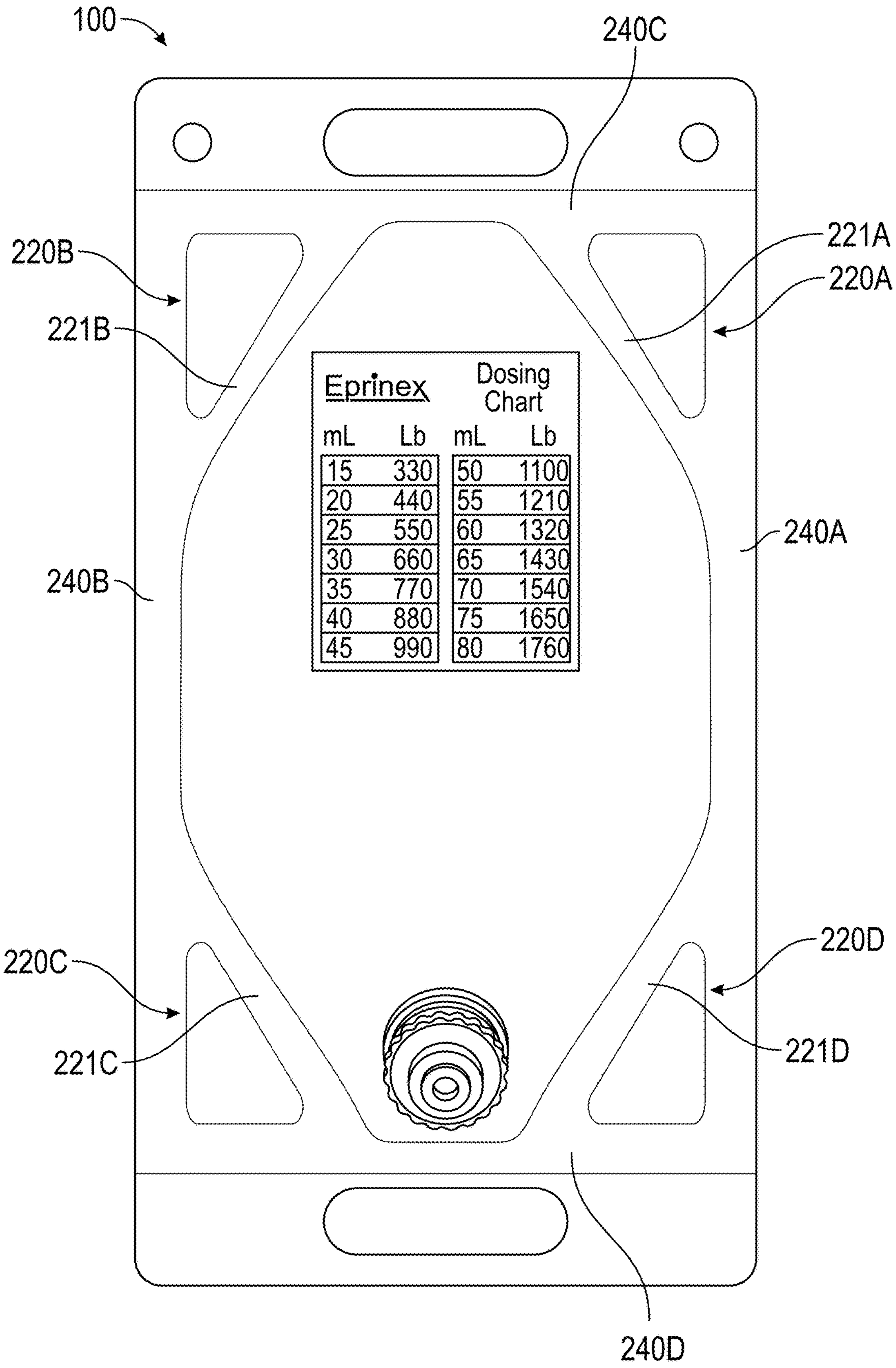

FIG. 6 is a front view of the embodiment of FIG. 5.

Figure 7:
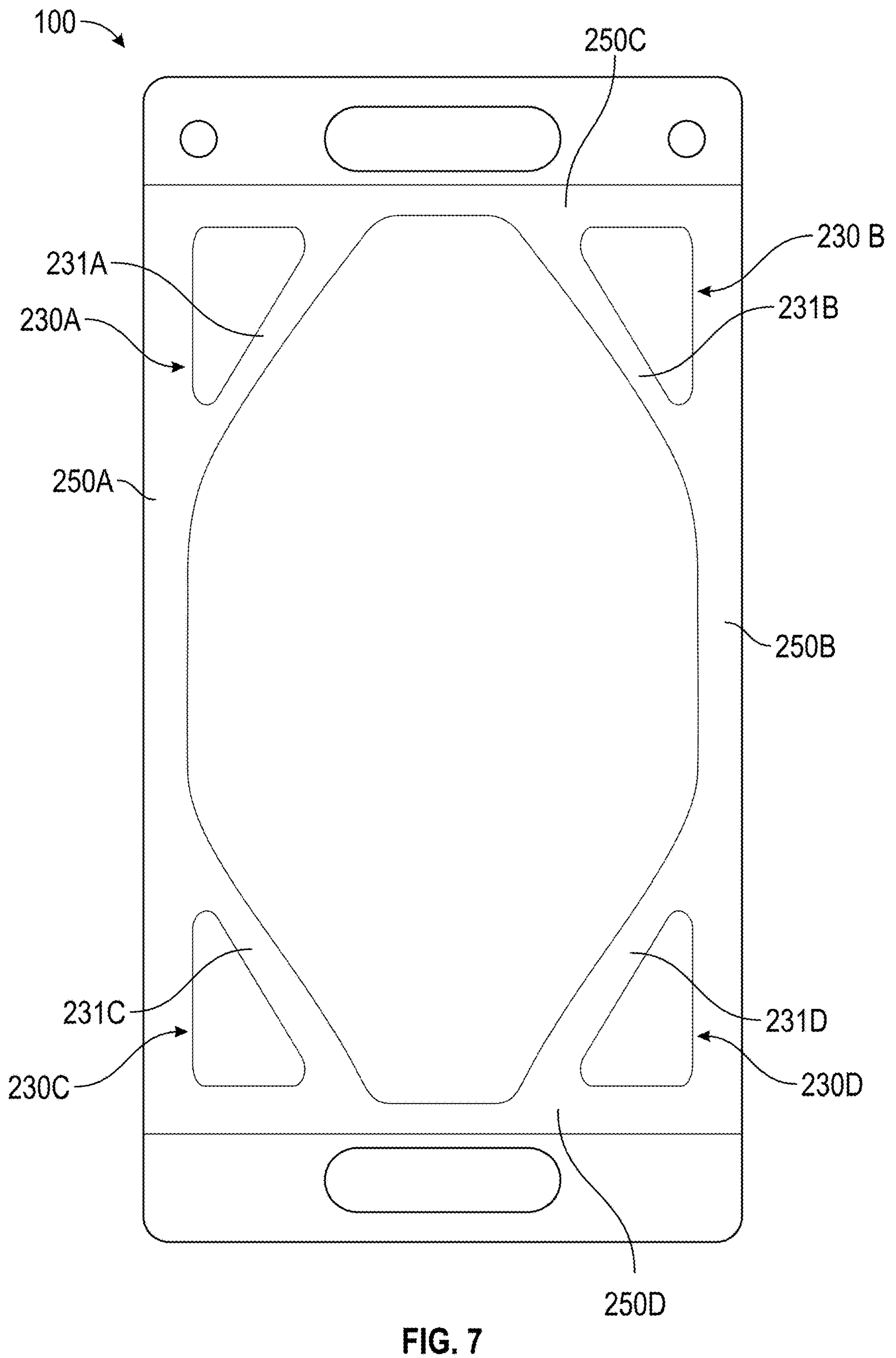

FIG. 7 is a rear view of the embodiment of FIG. 5.

Figure 8:
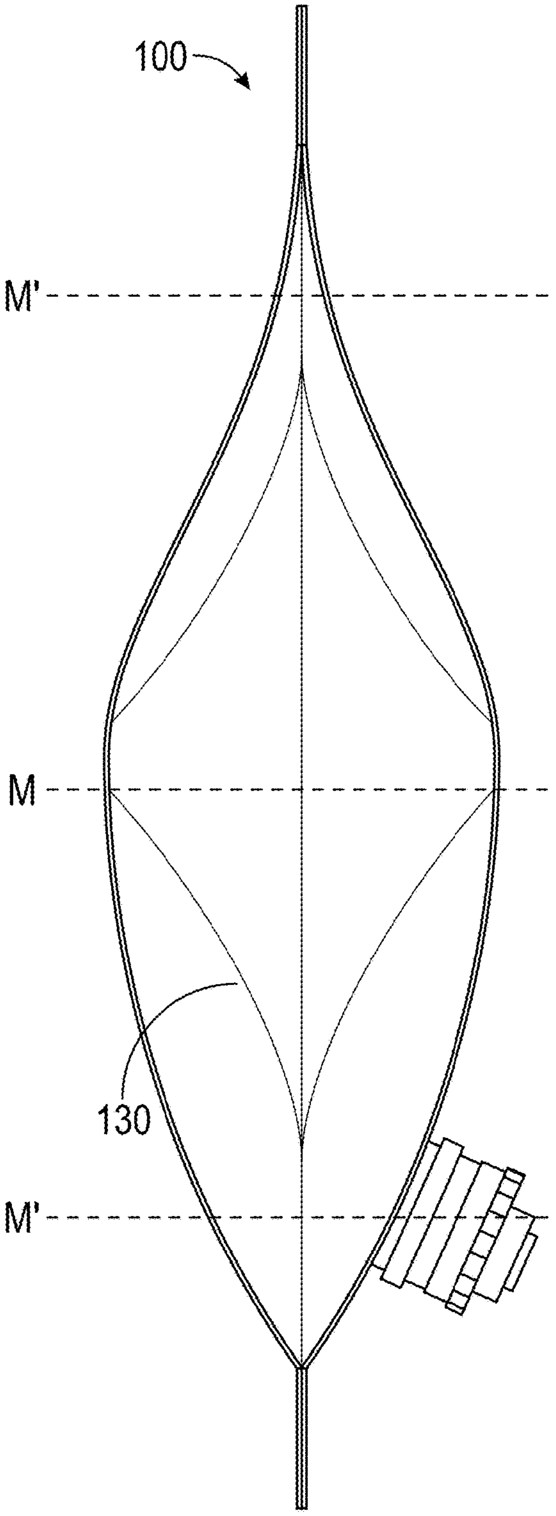

FIG. 8 is a left side view of the embodiment of FIG. 5.

Figure 9:
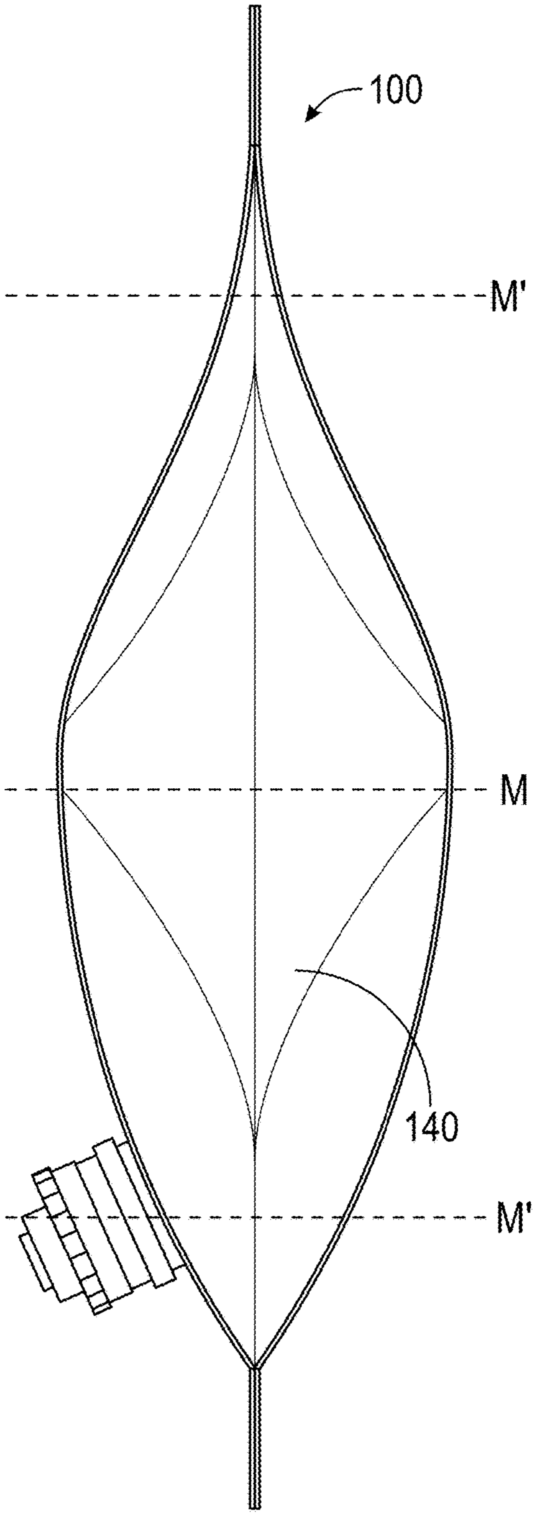

FIG. 9 is a right side view of the embodiment of FIG. 5.

Figure 10:
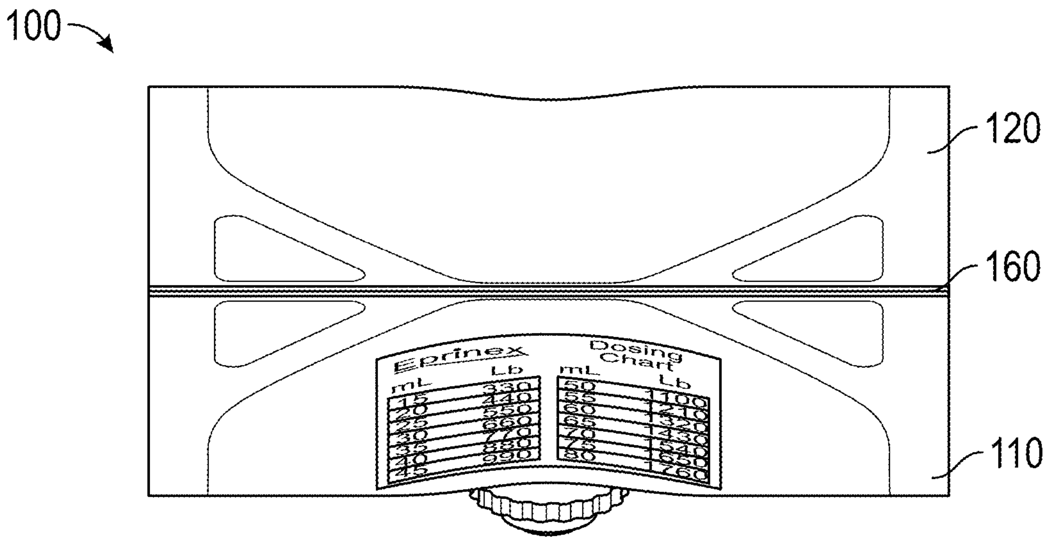

FIG. 10 is a top view of the embodiment of FIG. 5.

Figure 11:
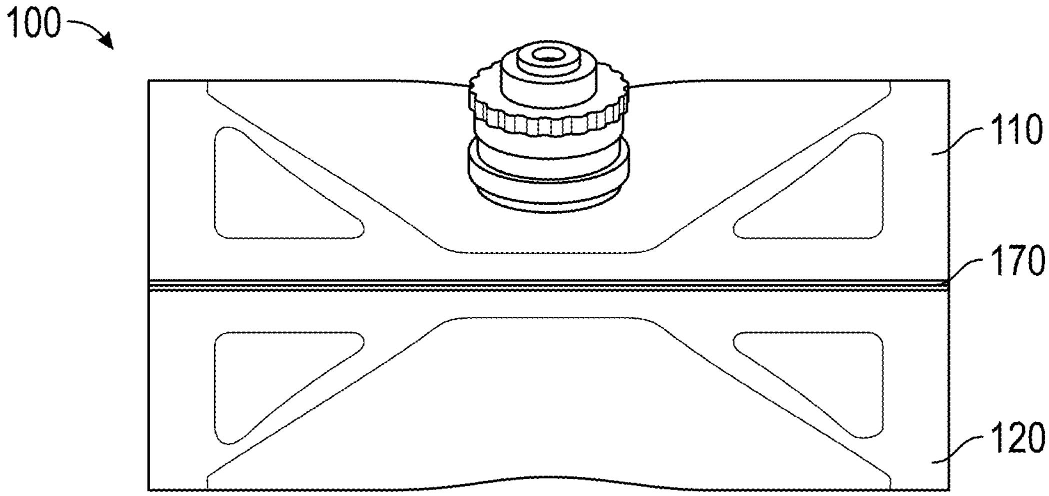

FIG. 11 is a bottom view of the embodiment of FIG. 5.

Figure 12:
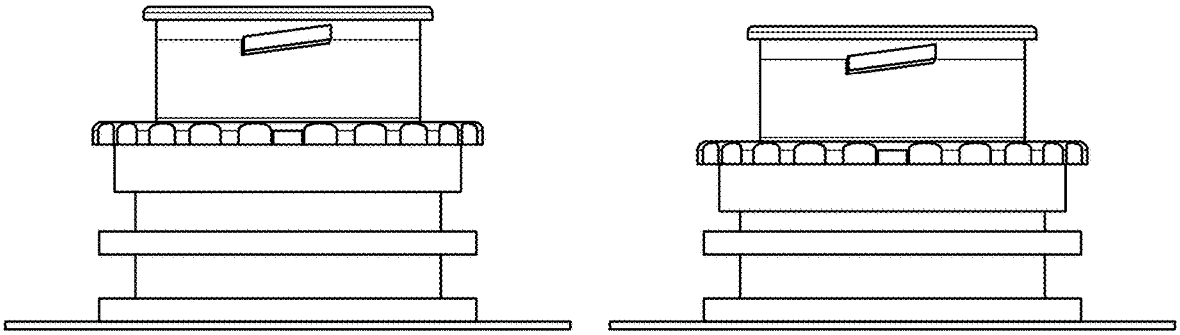

FIG. 12 is a side view of a dispenser spout male portion manufactured as part number TRU-SEAL® PMV2C VALVE BACKUP+AUS SPOUT by ITW Fastex New Zealand, an Illinois Tool Works Company A Division of ITW New Zealand Ltd 7 Charann Place, Avondale 1026, PO Box 71041, Rosebank 13418, New Zealand, which description is incorporated by reference herein and relied upon.

Figure 13:
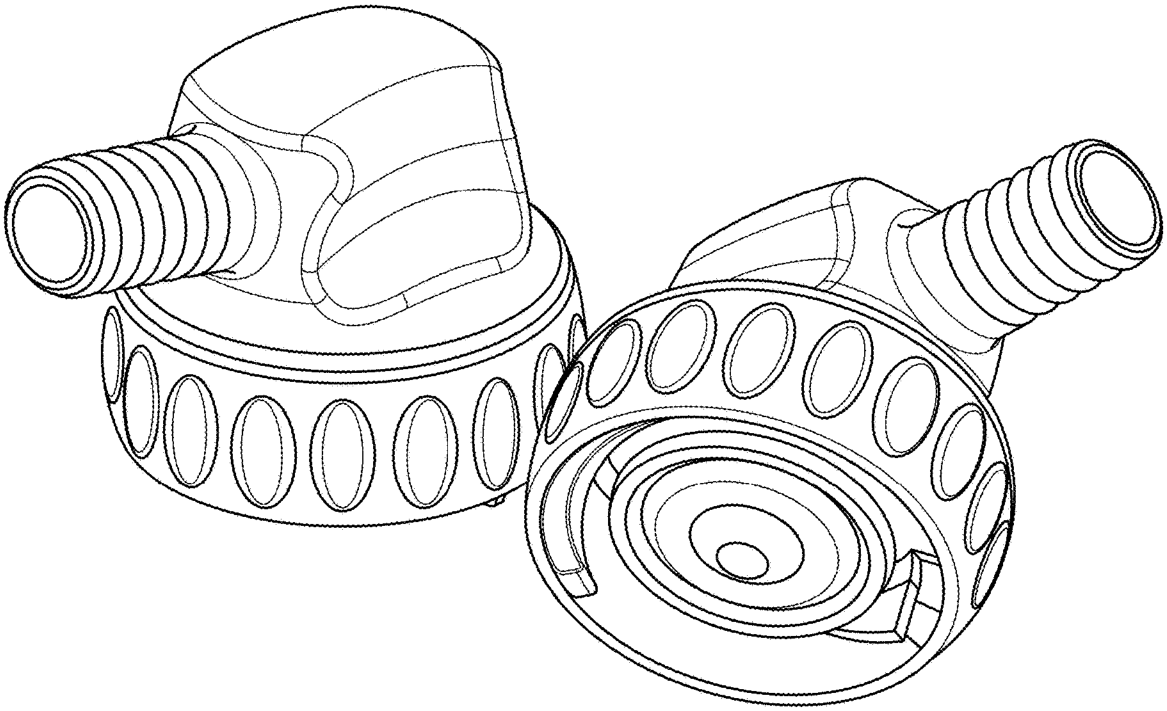

FIG. 13 is a perspective view of a dispenser spout female portion TRU-SEAL® PMV2C CON 13MM SINGLE BLUE by ITW Fastex New Zealand, which description is incorporated by reference herein and relied upon.

Figure 14:
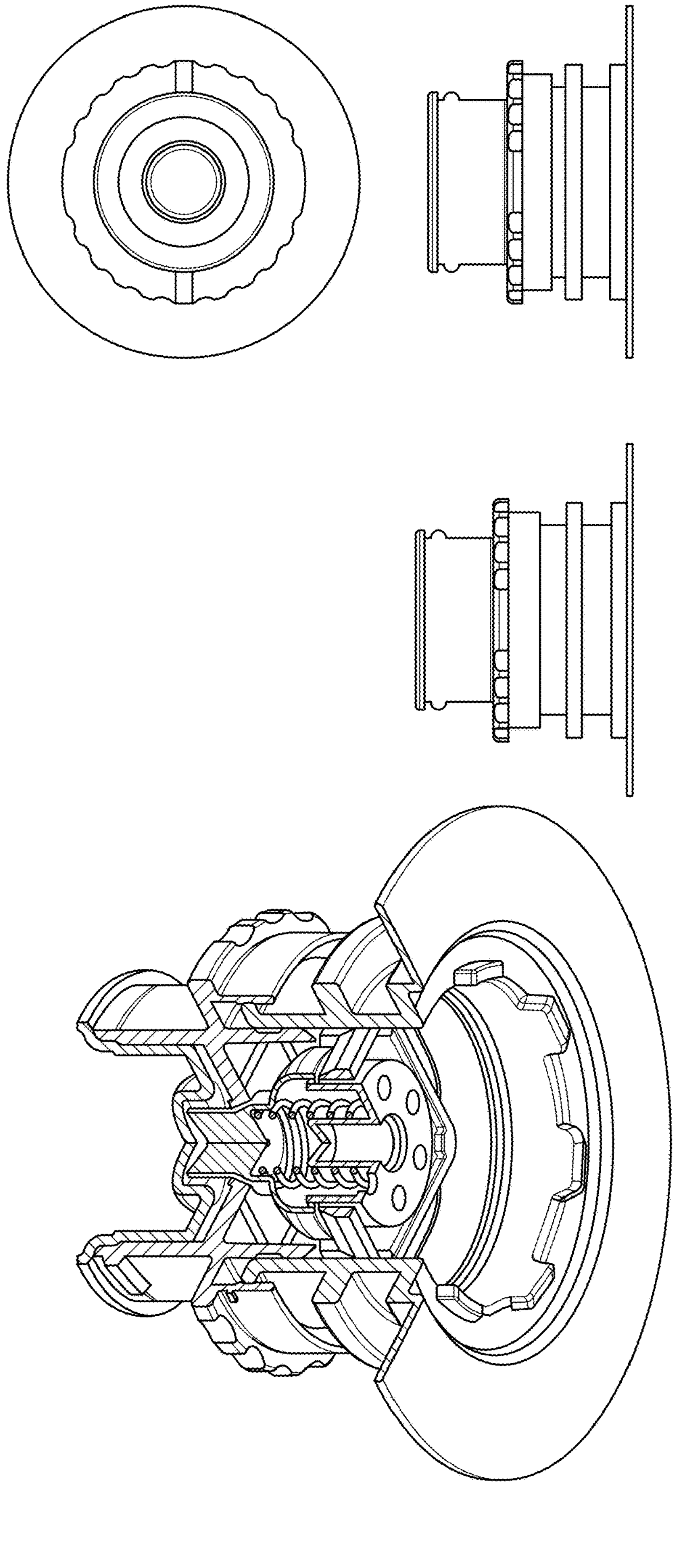

FIG. 14 is sectional view of a one-way valve held within the dispenser male portion of FIG. 12.

DETAILED DESCRIPTION OF THE INVENTION

The invention provides a stand-up pouch 10, for holding and dispensing fluid veterinary formulations, wherein a wall 13 of the pouch may be made of a flexible film material, wherein the pouch comprises A) a pouch body 12 comprising one or more wall 13 which body:
   - (a) defines a substantially square cross section forming a cavity for holding the fluid;
   - (b) a top closure 14 in the form of a gable roof extending from upper end 16 of the pouch body 12, wherein the top closure 14 includes a topwall 18 adjoining an inverted V-shaped vertical section 20, which vertical section comprises two sloping portions 20*a* and 20*b*; one on the front side of the container and the other on the rear side thereof;
   - (c) a bottom closure 22 continuous with the lower end 24 of the pouch body 12; and
   - (d) a fluid dispenser 30 comprising flow through passage extending through its length, comprising
     - i) a dispenser neck 32;
     - ii) a dispenser base 34 which protrudes radially outwardly from, and at a proximal end of, the dispenser neck 32;

iii) the dispenser base being attached to, e.g., about, the periphery of an aperture wall 13 of the pouch; and optionally, iv) a dispenser spout 50 which sealably, and optionally, threadably (46) engages a distal end, e.g., a threaded distal end 44, of the dispenser neck 32 and contains one-way valve; and optionally;

B) a drench gun having a fluid communication tube connected to the gun at the distal end of the tube, and the dispenser spout connected to the proximal end of the tube so as to permit fluid flow from said pouch body to said drench gun, wherein the tube is connected to the dispenser spout by means of a connector.

In a preferred embodiment of the invention, the one-way valve is selected from the group consisting of spring-loaded pin valve, spring loaded ball valve, flapper valve, slit valve, spring valve, check valve, swabbable valve, quadrolobe valve, overmolded flapper valve, duckbill valve, umbrella valve and combinations thereof.

In a preferred embodiment of the invention, the connector is selected from the group consisting of a quick-coupling connector, quick-release connector and combinations thereof.

In a preferred embodiment, with reference to FIGS. 5, 6, 7, 8, 9, 10. and 11, the bag 100 comprises a front side 110 and a back side 120, side walls 130 and 140 all of which define a pouch. Upper end 150 comprises top wall 160. Upper end 150 is shaped as a gable roof extending from top wall 160 toward a plane M that intersects the bag 100 about half-way between top wall 160 and bottom wall 170. Top wall 160 may comprises one or more hangar holes 180, 190 such that bag 100 may be hung in an enclosure or a carrier, e.g., a backpack, while dispensing an active ingredient carried in the bag. Top wall 160 may define a handle 200 and bottom wall 170 may define handle 210.

Front side 110 may be joined to side walls 130, 140 along perimeter seams 240A, 240B, 240C, 240D. Back side 120 may be joined to side walls 130, 140 along perimeter seams 250A, 250B, 250C, 250D. Front side 110 may be joined to sidewalls 130, 140 along internal seams 221A, 221B, 221C, 221D. Back side 120 may be joined to sidewalls 130, 140 along internal seams 231A, 231B, 231C, 231D. In this manner, the internal seams 221, 231, together with peripheral seams 240, 250, respectively, may form sealing regions 220A, 220B, 220C, 220D defined on front side 110 and 230A, 230B, 230C, 230D on back side 120. Each sealing region 220, 230 generally comprise a continuous seal of generally right-triangle shape. In this manner the side walls 130, 140 slope from plane M toward walls 160, 170 inwardly toward planes M' such that the cross-sectional area defined by plane M intersecting with the bag body is larger than a cross-sectional area defined by plane M'.

In a preferred embodiment of the invention, the one-way valve comprises (i) a male connector body 50 which e.g., may be substancially conical in shape, having a flow through 52 passage extending through its length and is attached to the proximal end of the tube;

(ii) a female connector body 30 which is substancially conical in shape, having a flow through passage extending through its length and is attached to the dispenser spout; such that when the male connector body is engaging said female connector body, fluid flow is permitted from said pouch body to said drench gun; and when the male connector body is disengaged from said female connector body, fluid flow is not permitted from said pouch body to said drench gun.

In an exemplary, non-limiting embodiment of a one-way valve, the valve body 30 is used by removing cap 36 and subsequently protective foil 42 to expose an upper portion of valve body 30. Threads 44 and 46 engage to drive tube 52 toward female portion 40. Tube 52 penetrates female portion 40 into the inner portion of valve 30 and liquid is released directionally toward tube 50 from wall 13.

In a preferred embodiment of the invention, the pouch body is not fillable with fluid when the dispenser spout engages the distal end of the dispenser neck.

In a preferred embodiment of the invention, the pouch body is not refillable with fluid after use.

In a preferred embodiment of the invention, the bottom closure is flat.

In a preferred embodiment of the invention, the bottom closure is in the form of a gable roof extending from the bottom end of the body, the bottom closure includes (i) a bottom wall having a V-shaped vertical section; and (ii) two sloping portions; one on the front side of the container and the other on the rear side thereof.

In a preferred embodiment of the invention, the dispenser body further comprises a removable cover engageable onto the distal end of the spout by a substantially axial movement.

In a preferred embodiment of the invention, the cover comprises a cap and a flexible handle, said handle being attached to said dispenser body and said cap.

In a preferred embodiment of the invention, the pouch body is filled with fluid through the dispenser neck before sealably engaging with the dispenser spout base.

In a preferred embodiment of the invention, the through-bore dispenser neck is easy to connect to a filling machine to fill the pouch body with fluid.

In a preferred embodiment of the invention, the dispenser body is not removable from the front sloping portion of the pouch.

In a preferred embodiment of the invention, the pouch passes the leak test, drop test, impact test, stack test, tensile strength test and cap test in accordance with the United Nations Recommendations for material with UN Code UN1029.

In a preferred embodiment of the invention, the flexible film material is a multilayered laminate.

In a preferred embodiment of the invention, the flexible film material is a laminate having at least a three-layer structure.

In a preferred embodiment of the invention, the flexible film material is a laminate having a four-layer structure.

In a preferred embodiment of the invention, the layers comprise material is sealable and selected from the group consisting of (1) foils made of metals, metallised layers or films made of plastics materials, in particular thermoplastic plastics materials or composites made of metal foils and plastics material films; and (2) thermoplastic plastics materials as mono films or film composites.

In a preferred embodiment of the invention, the thermoplastic plastics materials are sealable and selected from the group consisting of polyester, polyolefins, such as polypropylenes or polyethylenes, polyamides, polyvinylchloride, polycarbonate etc., or made of cellulose containing materials, such as cellophane or papers.

In a preferred embodiment of the invention, the foils are sealable and selected from the group consisting of aluminium foils, aluminium layers, ceramic silicon oxide thin layers, and ceramic aluminium oxide thin layers.

In a preferred embodiment of the invention, the flexible film material is a four-layered laminate selected from the group consisting of (i) PET (polyethylene terpthalate)/aluminum foil/oPA (oriented polyamide)/PE (Polyethylene) (or PP (polypropylene)),
(ii) PET (polyethylene terpthalate)/vacuum deposited barrier/oPA (oriented polyamide)/PE (Polyethylene) (or PP (polypropylene)),
(iii) PET (polyethylene terpthalate)/vacuum deposited barrier/PET (polyethylene terpthalate)/PE Polyethylene (or PP (polypropylene)), and
(iv) PET (polyethylene terpthalate)/PE (Polyethylene): EVOH (ethylene vinyl alcohol): PE (Polyethylene) (or PP: EVOH (ethylene vinyl alcohol):PP (polypropylene).

In a preferred embodiment of the invention, the flexible film material is a four-layered laminate selected from the group consisting of:

(i) PET (polyethylene terpthalate)/PETmet (metallized polyester)/oPA (oriented polyamide)/PE (Polyethylene), and (ii) PET (polyethylene terpthalate)/Aluminum film/oPA (oriented polyamide)/PE (Polyethylene).

In a preferred embodiment of the invention, the flexible film material is a four-layered laminate selected from the group consisting of:

(i) PET (polyethylene terpthalate) 12 μm/PETmet (metallized polyester)/oPA (oriented polyamide) 15 μm/PE (Polyethylene) PE80 μm or 160 μm, and (ii) PET (polyethylene terpthalate) 12 μm/Aluminum film 9 μm/oPA (oriented polyamide) 15 μm/PE (Polyethylene) PE80 μm or 160 μm.

In a preferred embodiment of the invention, the flexible film material is a four-layered laminate selected from the group consisting of:

(i) PET (polyethylene terpthalate) 12 μm/adhesive/PETmet (metallized polyester)/adhesive/oPA (oriented polyamide) 15 μm/adhesive/PE (Polyethylene) PE80 μm or 160 μm, and (ii) PET (polyethylene terpthalate) 12 μm/adhesive/Aluminum film 9 μm/adhesive/oPA (oriented polyamide) 15 μm/adhesive/PE (Polyethylene) PE80 μm or 160 μm.

In a preferred embodiment of the invention, the flexible film material has a total thickness of about 125 to about 205 μm or about 130 to about 210 μm.

In a preferred embodiment of the invention, the layers comprise material has barrier properties against the passage of liquids, gases, vapours, steam, flavours or odorous materials.

In a preferred embodiment of the invention, the thickness of the films which are made of thermoplastic plastics materials may, for example, be 8 to 100 μm, 12 to 30 μm or 12 to 23 μm.

In a preferred embodiment of the invention, the thickness of the films which are made of steel foils or aluminium are between 5 to 100 μm or 8 to 30 μm.

In a preferred embodiment of the invention, the side of the film material which is on the inside of the pouch is sealable.

In a preferred embodiment of the invention, the side of the film material which is on the outside of the pouch is sealable.

In a preferred embodiment of the invention, the flexible film material is inert to a fluid veterinary formulation selected from the group consisting of Eprinex pour On®, Ivomec Pour On®, Ivomec Sheep Oral®, and Topline® during their shelf life of 3 years or during storage conditions oft 40° C. temperature and 75% humidity for 6 months.

In a preferred embodiment of the invention, the seals are inert to a fluid veterinary formulation selected from the group consisting of Eprinex pour On®, Ivomec Pour On®, Ivomec Sheep Oral®, and Topline® during their shelf life of 3 years or during storage conditions oft 40° C. temperature and 75% humidity for 6 months.

In a preferred embodiment of the invention, the flexible film material has excellent barrier properties against oxygen and light, fair resistance to water permeation, and good impact strength.

In a preferred embodiment of the invention, the flexible film material has good rigidity i.e., thickness and composition capable of keeping the tubular shape of the pouch.

In a preferred embodiment of the invention, the volume of the pouch is from about 2 to about 20 litres, from about 5 to about 20 litres, from about 15 to about 20 litres, from about 2 to about 5 litres, from about 2 to about 10 litres, or from about 2 to about 15 litres.

In a preferred embodiment of the invention, the pouch is transportable without secondary packaging e.g. a box.

In a preferred embodiment of the invention, the pouch contains a fluid veterinary formulation selected from the group consisting of Eprinex pour On®, Ivomec Pour On®, Ivomec Sheep Oral®, and Topline®.

In a preferred embodiment of the invention, the pouch provides a stable fluid veterinary formulation for up to 36 months at room temperature.

In a preferred embodiment of the invention, the pouch body is substantially rigid when the enclosure is filled with fluid.

In a preferred embodiment of the invention, the pouch body is self-standing without any additional support members.

In a preferred embodiment of the invention, the pouch body does not require any spare material to help support the pouch when filled with a fluid.

In a preferred embodiment of the invention, the pouch body is designed so that it may be manufactured, stored, and/or shipped in a flat form.

In a preferred embodiment of the invention, the pouch body expands to a desired form and becomes self-standing even when partially filled with fluid by the fluid exerting a pressure on the bag walls which forces the bag to conform to the bag geometry defined by the contour structures.

In a preferred embodiment of the invention, the pouch body does not contain a bottom "horizontal" panel gussets, more commonly known as bottom gussets which the pouch may stand without support.

In a preferred embodiment of the invention, the pouch body includes at least one integrated handle that facilitates the carrying of a filled pouch.

In a preferred embodiment of the invention, the pouch body at least one handle.

In a preferred embodiment of the invention, the handle is attached to a seal.

In a preferred embodiment of the invention, the handle is reinforced.

In a preferred embodiment of the invention, the handle is a loop.

In a preferred embodiment of the invention, the handle is planar.

In a preferred embodiment of the invention, the handle includes a recess.

In a preferred embodiment of the invention, the handle includes at least one opening.

In a preferred embodiment of the invention, the rear side of the pouch body includes at least one grasping member.

In a preferred embodiment of the invention, the pouch body is hung upside down during use.

In a preferred embodiment of the invention, the pouch body after use contains little residual fluid formulation.

In a preferred embodiment of the invention, the pouch body has a volume of 2.5 L having dimensions, when empty of fluid of Width 174 cm/Depth 104 cm/length 347 cm; and facing dimensions 154 cm×110 cm.

In a preferred embodiment of the invention, the pouch body has a volume of 5 L having dimensions, when empty of fluid of Width 185 cm/depth 145 cm/Length 460 cm; and facing dimensions 165 cm×185 cm.

In a preferred embodiment of the invention, the stand-up pouch as illustrated in the figures.

In a preferred embodiment of the invention, the dispenser body as illustrated in the figures.

In a preferred embodiment of the invention, the connector as illustrated in the figures.

Some embodiments of the disclosure are:

Embodiment 1. A stand-up pouch, for holding and dispensing fluid veterinary formulations, made of a flexible film material in which the pouch comprises A) a pouch body having:

(a) a substancially square cross section forming a cavity for holding the fluid;

(b) a top closure in the form of a gable roof extending from the upper end of the pouch body, the top closure includes (i) a topwall having an inverted V-shaped vertical section; and (ii) two sloping portions; one on the front side of the container and the other on the rear side thereof;

(c) a bottom closure continuous with the lower end of the pouch body; and (d) a fluid dispenser means comprising a dispenser body, having a flow through passage extending through its length, provided with i) a dispenser neck;

ii) a dispenser base which protrudes radially outwardly from, and at the proximal end of, the dispenser neck;

iii) the dispenser base being attached to the periphery of an aperture in said front sloping portion of the pouch;

iv) the dispenser spout which sealably engages the distal end of the dispenser neck and contains one-way valve;

B) a drench gun having a fluid communication tube connected to the gun at the distal end of the tube, and the dispenser spout connected to the proximal end of the tube so as to permit fluid flow from said pouch body to said drench gun, wherein the tube is connected to the dispenser spout by means of a connector.

Embodiment 2. A stand-up pouch according to embodiment 1, wherein the one-way valve is selected from the group consisting of spring-loaded pin valve, spring loaded ball valve, flapper valve, slit valve, spring valve, check valve, swabbable valve, quadrolobe valve, overmolded flapper valve, duckbill valve, umbrella valve and combinations thereof.

Embodiment 3. A stand-up pouch according to embodiment 1, wherein connector is selected from the group consisting of a quick-coupling connector, quick-release connector and combinations thereof.

Embodiment 4. A stand-up pouch according to embodiment 1, wherein the one-way valve comprises (i) a male connector body which is substancially conical in shape, having a flow through passage extending through its length and is attached to the proximal end of the tube;

(ii) a female connector body which is substancially conical in shape, having a flow through passage extending through its length and is attached to the dispenser spout; such that when the male connector body is engaging said female connector body, fluid flow is permitted from said pouch body to said drench gun; and when the male connector body is disengaged from said female connector body, fluid flow is not permitted from said pouch body to said drench gun.

Embodiment 5. A stand-up pouch according to embodiment 1, wherein the pouch body is not Tillable with fluid when the dispenser spout engages the distal end of the dispenser neck.

Embodiment 6. A stand-up pouch according to embodiment 1, wherein the pouch body is not refillable with fluid after use.

Embodiment 7. A stand-up pouch according to embodiment 1, wherein the bottom closure is flat.

Embodiment 8. A stand-up pouch according to embodiment 1, wherein the bottom closure is in the form of a gable roof extending from the bottom end of the body, the bottom closure includes (i) a bottom wall having a V-shaped vertical section; and (ii) two sloping portions; one on the front side of the container and the other on the rear side thereof.

Embodiment 9. A stand-up pouch according to embodiment 1, wherein the dispenser body further comprises a removable cover engageable onto the distal end of the spout by a substantially axial movement.

Embodiment 10. A stand-up pouch according to embodiment 1, wherein the cover comprises a cap and a flexible handle, said handle being attached to said dispenser body and said cap.

Embodiment 11. A stand-up pouch according to embodiment 1, wherein the pouch body is filled with fluid through the dispenser neck before sealably engaging with the dispenser spout base.

Embodiment 12. A stand-up pouch according to embodiment 1, wherein the through-bore dispenser neck is easy to connect to a filling machine to fill the pouch body with fluid.

Embodiment 13. A stand-up pouch according to embodiment 1, wherein the dispenser body is not removable from the front sloping portion of the pouch.

Embodiment 14. A stand-up pouch according to embodiment 1, wherein the pouch passes the leak test, drop test, impact test, stack test, tensile strength test and cap test in accordance with the United Nations Recommendations for material with UN Code UN1029.

Embodiment 15. A stand-up pouch according to embodiment 1, wherein the flexible film material is a multilayered laminate.

Embodiment 16. A stand-up pouch according to embodiment 1, wherein the flexible film material is a laminate having at least a three-layer structure.

Embodiment 17. A stand-up pouch according to embodiment 1, wherein the flexible film material is a laminate having a four-layer structure.

Embodiment 18. A stand-up pouch according to embodiment 1, wherein the layers comprise material is sealable and selected from the group consisting of (1) foils made of metals, metallised layers or films made of plastics materials, in particular thermoplastic plastics materials or composites made of metal foils and plastics material films; and
(2) thermoplastic plastics materials as mono films or film composites.

Embodiment 19. A stand-up pouch according to embodiment 1, wherein thermoplastic plastics materials are sealable and selected from the group consisting of polyester, polyolefins, such as polypropylenes or polyethylenes, polyamides, polyvinylchloride, polycarbonate etc., or made of cellulose containing materials, such as cellophane or papers.

Embodiment 20. A stand-up pouch according to embodiment 1, wherein the foils are sealable and selected from the group consisting of aluminium foils, aluminium layers, ceramic silicon oxide thin layers, and ceramic aluminium oxide thin layers.

Embodiment 21. A stand-up pouch according to embodiment 1, wherein the flexible film material is a four-layered laminate selected from the group consisting of
(i) PET (polyethylene terpthalate)/aluminum foil/oPA (oriented polyamide)/PE (Polyethylene) (or PP (polypropylene)),
(ii) PET (polyethylene terpthalate)/vacuum deposited barrier/oPA (oriented polyamide)/PE (Polyethylene) (or PP (polypropylene)),
(iii) PET (polyethylene terpthalate)/vacuum deposited barrier/PET (polyethylene terpthalate)/PE Polyethylene (or PP (polypropylene)), and
(iv) PET (polyethylene terpthalate)/PE (Polyethylene): EVOH (ethylene vinyl alcohol):PE (Polyethylene) (or PP: EVOH (ethylene vinyl alcohol): PP (polypropylene).

Embodiment 22. A stand-up pouch according to embodiment 1, wherein the flexible film material is a four-layered laminate selected from the group consisting of:
(i) PET (polyethylene terpthalate)/PETmet (metallized polyester)/oPA (oriented polyamide)/PE (Polyethylene), and
(ii) PET (polyethylene terpthalate)/Aluminum film/oPA (oriented polyamide)/PE (Polyethylene).

Embodiment 23. A stand-up pouch according to embodiment 1, wherein the flexible film material is a four-layered laminate selected from the group consisting of:
(i) PET (polyethylene terpthalate) 12 μm/PETmet (metallized polyester)/oPA (oriented polyamide) 15 μm/PE (Polyethylene) PE80 μm or 160 μm, and
(ii) PET (polyethylene terpthalate) 12 μm/Aluminum film 9 μm/oPA (oriented polyamide) 15 μm/PE (Polyethylene) PE80 μm or 160 μm.

Embodiment 24. A stand-up pouch according to embodiment 1, wherein the flexible film material is a four-layered laminate selected from the group consisting of:
(i) PET (polyethylene terpthalate) 12 μm/adhesive/PETmet (metallized polyester)/adhesive/oPA (oriented polyamide) 15 μm/adhesive/PE (Polyethylene) PE80 μm or 160 μm, and
(ii) PET (polyethylene terpthalate) 12 μm/adhesive/Aluminum film 9 μm/adhesive/oPA (oriented polyamide) 15 μm/adhesive/PE (Polyethylene) PE80 μm or 160 μm.

Embodiment 25. A stand-up pouch according to embodiment 1, wherein the flexible film material has a total thickness of about 125 to about 205 μm or about 130 to about 210 μm.

Embodiment 26. A stand-up pouch according to embodiment 1, wherein the layers comprise material has barrier properties against the passage of liquids, gases, vapours, steam, flavours or odorous materials.

Embodiment 27. A stand-up pouch according to embodiment 1, wherein the thickness of the films which are made of thermoplastic plastics materials may, for example, be 8 to 100 μm, 12 to 30 μm or 12 to 23 μm.

Embodiment 28. A stand-up pouch according to embodiment 1, wherein the thickness of the films which are made of steel foils or aluminium are between 5 to 100 μm or 8 to 30 μm.

Embodiment 29. A stand-up pouch according to embodiment 1, wherein the side of the film material which is on the inside of the pouch is sealable.

Embodiment 30. A stand-up pouch according to embodiment 1, wherein the side of the film material which is on the outside of the pouch is sealable.

Embodiment 31. A stand-up pouch according to embodiment 1, wherein the flexible film material is inert to a fluid veterinary formulation selected from the group consisting of Eprinex pour On®, Ivomec Pour On®, Ivomec Sheep Oral®, and Topline® during their shelf life of 3 years or during storage conditions of 40° C. temperature and 75% humidity for 6 months.

Embodiment 32. A stand-up pouch according to any of embodiments 18 to 20, wherein the seals are inert to a fluid veterinary formulation selected from the group consisting of Eprinex pour On®, Ivomec Pour On®, Ivomec Sheep Oral®, and Topline® during their shelf life of 3 years or during storage conditions of 40° C. temperature and 75% humidity for 6 months.

Embodiment 33. A stand-up pouch according to embodiment 1, wherein the flexible film material has excellent barrier properties against oxygen and light, fair resistance to water permeation, and good impact strength.

Embodiment 34. A stand-up pouch according to embodiment 1, wherein the flexible film material has good rigidity i.e., thickness and composition capable of keeping the tubular shape of the pouch.

Embodiment 35. A stand-up pouch according to embodiment 1, wherein the volume of the pouch is from about 2 to about 20 litres, from about 5 to about 20 litres, from about 15 to about 20 litres, from about 2 to about 5 litres, from about 2 to about 10 litres, or from about 2 to about 15 litres.

Embodiment 36. A stand-up pouch according to embodiment 1, wherein the pouch is transportable without secondary packaging e.g. a box.

Embodiment 37. A stand-up pouch according to embodiment 1, wherein the pouch contains a fluid veterinary formulation selected from the group consisting of Eprinex pour On®, Ivomec Pour On®, Ivomec Sheep Oral®, and Topline®.

Embodiment 38. A stand-up pouch according to embodiment 1, wherein the pouch provides a stable fluid veterinary formulation for up to 36 months at room temperature.

Embodiment 39. A stand-up pouch according to embodiment 1, wherein the pouch body is substantially rigid when the enclosure is filled with fluid.

Embodiment 40. A stand-up pouch according to embodiment 1, wherein the pouch body is self-standing without any additional support members.

Embodiment 41. A stand-up pouch according to embodiment 1, wherein the pouch body does not require any spare material to help support the pouch when filled with a fluid.

Embodiment 42. A stand-up pouch according to embodiment 1, wherein the pouch body is designed so that it may be manufactured, stored, and/or shipped in a flat form.

Embodiment 43. A stand-up pouch according to embodiment 1, wherein the pouch body expands to a desired form and becomes self-standing even when partially filled with fluid by the fluid exerting a pressure on the bag walls which forces the bag to conform to the bag geometry defined by the contour structures.

Embodiment 44. A stand-up pouch according to embodiment 1, wherein the pouch body does not contain a bottom "horizontal" panel gussets, more commonly known as bottom gussets which the pouch may stand without support.

Embodiment 45. A stand-up pouch according to embodiment 1, wherein the pouch body includes at least one integrated handle that facilitates the carrying of a filled pouch.

Embodiment 46. A stand-up pouch according to embodiment 1, wherein the pouch body at least one handle.

Embodiment 47. A stand-up pouch according to embodiment 46, wherein the handle is attached to a seal.

Embodiment 48. A stand-up pouch according to embodiment 46, wherein the handle is reinforced.

Embodiment 49. A stand-up pouch according to embodiment 46, wherein the handle is a loop.

Embodiment 50. A stand-up pouch according to embodiment 46, wherein the handle is planar.

Embodiment 51. A stand-up pouch according to embodiment 46, wherein the handle includes a recess.

Embodiment 52. A stand-up pouch according to embodiment 46, wherein the handle includes at least one opening.

Embodiment 53. A stand-up pouch according to embodiment 1, wherein the rear side of the pouch body includes at least one grasping member.

Embodiment 54. A stand-up pouch according to embodiment 1, wherein the pouch body is hung upside down during use.

Embodiment 55. A stand-up pouch according to embodiment 1, wherein there is little residual fluid formulation in the pouch body after use.

Embodiment 56. A stand-up pouch according to embodiment 1, wherein the pouch body has a volume of 2.5 L having dimensions, when empty of fluid of Width 174 cm/Depth 104 cm/length 347 cm; and facing dimensions 154 cm×110 cm.

Embodiment 57. A stand-up pouch according to embodiment 1, wherein the pouch body has a volume of 5 L having dimensions, when empty of fluid of Width 185 cm/depth 145 cm/Length 460 cm; and facing dimensions 165 cm×185 cm.

The invention claimed is:

1. A pouch body comprising: a plurality of walls define a cross section, the walls forming a cavity for holding the fluid; a top closure in the form of a gable roof extending from an upper end of the pouch body, wherein the top closure includes a topwall, the topwall comprising a first rectangular shape and comprising a first elliptical shaped handle, the first elliptical shaped handle comprising a first elliptical shaped aperture in the topwall, the first rectangular shape comprising a first width, the first elliptical shaped aperture having a second width perpendicular to its longitudinal axis, the second width being greater than one-half of the first width; a bottom closure in the form of a gable roof extending from a lower end of the pouch body, wherein the bottom closure includes a bottom wall, the bottom wall comprising a second rectangular shape and comprising a second elliptical shaped handle, the second elliptical shaped handle comprising a second elliptical shaped aperture in the bottom wall, the second rectangular shape comprising a third width equal to the first width, the second elliptical shaped aperture having a third width perpendicular to its longitudinal axis and equal to the second width, the third width being greater than one-half of the second width; a front wall coupled to the topwall and bottom wall, the front wall comprising a third rectangular shape where the topwall and bottom wall define two short sides of the third rectangular shape; a rear wall coupled to the topwall and bottom wall, the rear wall comprising a fourth rectangular shape where the topwall and bottom wall define two short sides of the fourth rectangular shape; a first sidewall coupled to the topwall and bottom wall, the first sidewall being coupled to the front wall and the rear wall by a plurality of peripheral seams; a second sidewall coupled to the topwall and bottom wall, the second sidewall being coupled to the front wall and the rear wall by a plurality of peripheral seams; the plurality of peripheral seams present on the front wall and rear wall defining at least a plurality of sealing regions, each sealing region having a right-triangular shape formed on the front wall and the rear wall by internal seams together with the plurality of peripheral seams, a first set of four sealing regions being disposed within the third rectangular shape of the front wall, a second set of four sealing regions being disposed within the fourth rectangular shape of the rear wall; a first geometric plane intersects the pouch body about half-way between the topwall and the bottom wall, the top closure defines a second geometric plane, the bottom closure defines a third geometric plane: with each sealing region having a right triangular shape, the first sidewall slopes from the first geometric plane towards both the second geometric plane and the third geometric plane, and the second sidewall slopes from the first geometric plane towards both the second geometric plane and the third geometric plane such that the cross-sectional area defined by the first geometric plane intersecting the pouch body is larger than the cross-sectional area defined by the second geometric plane intersecting the pouch body and the cross-sectional area defined by the third geometric plane intersection the pouch body; and a fluid dispenser comprising a one-way valve having a first set of threads and a female portion, the female portion receiving a tube of a dispenser spout having a second set of threads when the first set of threads engage the second set of threads, the fluid dispenser attached to the front wall toward the bottom closure, the fluid dispenser configured to allow liquid to be dispensed from the inside the pouch body, the first sidewall and second sidewall each having an eye-shape geometry defined by an edge of the front wall and an edge of the rear wall when the pouch body expands to contain the liquid that is to be dispensed from the inside of the pouch body; and wherein each wall is a flexible film material that is a four-layered laminate selected from the group consisting of: (i) PET (polyethylene terpthalate) 12 pm/PETmet (metallized polyester)/oPA (oriented polyamide) 15 pm/PE (Polyethylene) PE80 pm or 160 pm, and (ii) PET (poly ethylene terpthalate) 12 pm/Aluminum film 9 pm/oPA (oriented polyamide) 15 pm/PE (Polyethylene) PE80 pm or 160 pm.

2. The pouch body of claim 1 wherein the top closure comprises a circular opening adjacent to the handle to allow the body to be hung from a holder.

3. The pouch body of claim 2, further comprising a plurality of circular openings.

4. The pouch body of claim 1 wherein the flexible film material is a multilayered laminate.

5. The pouch body of claim 1, wherein the pouch body passes a leak test, drop test, impact test, stack test, tensile strength test and cap test in accordance with the United Nations Recommendations for material with UN Code UN1029.

6. The pouch body of claim 1, wherein the flexible film material is a three or four-layer laminate.

7. A pouch body according to claim 1, wherein the flexible film material has a total thickness of 125 to 205 pm or 130 to 210 pm.

* * * * *